(12) United States Patent
McVicar et al.

(10) Patent No.: US 12,454,425 B2
(45) Date of Patent: Oct. 28, 2025

(54) TRANSFER PLATE MECHANISM OF AN APPARATUS FOR LOADING AND UNLOADING A SHIPPING CONTAINER

(71) Applicant: Combilift, Monaghan (IE)

(72) Inventors: Martin McVicar, Milltown (IE); Robert Moffett, Clontibret (IE); Mark Whyte, Castleblaney (IE)

(73) Assignee: Combilift, Monaghan (IE)

(*) Notice: Subject to any disclaimer, the term of this patent is extended or adjusted under 35 U.S.C. 154(b) by 158 days.

(21) Appl. No.: 18/392,249

(22) Filed: Dec. 21, 2023

(65) Prior Publication Data
US 2025/0206550 A1    Jun. 26, 2025

(30) Foreign Application Priority Data
Dec. 23, 2022    (GB) ..................................... 2219618

(51) Int. Cl.
*B65G 25/06*    (2006.01)
*B65G 65/00*    (2006.01)
*B65G 65/32*    (2006.01)

(52) U.S. Cl.
CPC ........... *B65G 65/32* (2013.01); *B65G 65/005* (2013.01)

(58) Field of Classification Search
None
See application file for complete search history.

(56) References Cited

U.S. PATENT DOCUMENTS

| | | | | |
|---|---|---|---|---|
| 3,186,566 A * | 6/1965 | Spinanger | ............ | B65G 67/20 414/400 |
| 3,664,533 A * | 5/1972 | Hand | .................... | B60P 1/6436 414/499 |
| 3,727,777 A * | 4/1973 | Hanson | .................. | B65G 67/20 414/400 |
| 3,780,893 A * | 12/1973 | Lassig | .................... | B65G 67/20 414/400 |
| 3,952,887 A * | 4/1976 | Lutz | ....................... | B65G 67/20 198/774.4 |
| 4,537,554 A * | 8/1985 | Collins, Jr. | ............ | B65G 67/20 414/373 |
| 4,832,559 A * | 5/1989 | Gebbardt | ............... | B65G 67/20 414/398 |
| 5,054,987 A * | 10/1991 | Thornton | .................. | B60P 1/52 414/400 |

(Continued)

FOREIGN PATENT DOCUMENTS

WO    WO-2019206710 A1 * 10/2019 ............ B65G 67/20

*Primary Examiner* — Joseph A Dillon, Jr.
(74) *Attorney, Agent, or Firm* — Whiteford, Taylor and Preston, LLP; Gregory M. Stone

(57) ABSTRACT

An apparatus for loading a shipping container, comprising a transfer plate having a first set of holes and a second set of holes therein and configured to slide, together with an article thereon, into and out of the shipping container, a transfer means positioned underneath the transfer plate having a first carriage with a first set of pins and a second carriage with a second set of pins, the first set of pins configured to extend into the first set of holes and the second set of pins configured to extend into the second set of holes to pull the transfer plate into and out of the shipping container, and a controller configured to extend the second set of pins into the second set of holes when the first sets of pins are already extended into the first set of holes.

16 Claims, 10 Drawing Sheets

(56) References Cited

U.S. PATENT DOCUMENTS

| | | | | |
|---|---|---|---|---|
| 5,186,596 | A * | 2/1993 | Boucher | B65G 67/20 |
| | | | | 414/400 |
| RE35,156 | E * | 2/1996 | Hallstrom, Jr. | B65G 25/065 |
| | | | | 198/750.3 |
| 5,716,184 | A * | 2/1998 | Lowe | B65G 67/08 |
| | | | | 414/400 |
| 5,921,740 | A * | 7/1999 | Stewart | B65G 67/08 |
| | | | | 414/400 |
| 6,168,371 | B1 * | 1/2001 | Lesmeister | B65D 88/121 |
| | | | | 414/525.2 |
| 6,494,309 | B2 * | 12/2002 | Pottier | B41F 15/0863 |
| | | | | 198/468.9 |
| 7,695,235 | B1 * | 4/2010 | Rallis | B65G 47/54 |
| | | | | 414/400 |
| 7,866,932 | B1 * | 1/2011 | Pool | B65G 67/20 |
| | | | | 414/400 |
| 8,596,948 | B2 * | 12/2013 | Miles | B65B 5/106 |
| | | | | 414/331.03 |
| 10,428,577 | B2 * | 10/2019 | Viinonen | E06B 9/00 |
| 10,696,501 | B2 * | 6/2020 | Lemans | B65G 69/006 |
| 10,781,061 | B2 * | 9/2020 | Huang | B65G 67/20 |
| 10,865,057 | B2 * | 12/2020 | Viinonen | B65G 67/20 |
| 11,059,684 | B2 * | 7/2021 | Pakkanen | B65G 67/20 |
| 12,060,237 | B2 * | 8/2024 | McVicar | B66F 9/04 |
| 2011/0274532 | A1 * | 11/2011 | Poutanen | B65G 7/02 |
| | | | | 414/800 |
| 2012/0027555 | A1 * | 2/2012 | Germain | B65G 57/245 |
| | | | | 414/791.6 |
| 2019/0161294 | A1 * | 5/2019 | Pakkanen | B65G 67/20 |
| 2025/0153944 | A1 * | 5/2025 | Cohen | B65G 47/917 |

* cited by examiner

TRANSFER PLATE MECHANISM OF AN APPARATUS FOR LOADING AND UNLOADING A SHIPPING CONTAINER

TECHNICAL FIELD

This invention relates to a mechanism for moving a sliding plate of an apparatus for loading and unloading a shipping container articles, through an opening at one end of the shipping container.

BACKGROUND ART

In loading various articles into shipping containers, such as freight containers, wagons, trucks or the like, it is often difficult to transfer the articles into the shipping in such a way that on the one hand, the space is utilized as well as possible and on the other hand, the articles are not damaged during loading and transportation. This is because the shipping container is generally open at one end and all articles must enter through this end. A number of apparatuses have been developed for loading shipping containers through an opening at one end.

An example of such an apparatus is disclosed in WO 9523105. This prior art document discloses a method and apparatus for loading products to be transported into a cargo space. The apparatus disclosed utilizes a transfer plate, on top of which the load is first formed. Next, the load together with the transfer plate is pushed into the cargo space, after which the transfer plate is pulled out from under the load. The load is supported during the pulling. In the method, the products are first loaded onto a transfer plate that is outside the cargo space and can be pushed into the cargo space from a side of the cargo space that is entirely open. After this, the products are transferred to the interior of the cargo space by pushing the transfer plate in over the bottom of the cargo space. Finally, the products are supported from the open side and the transfer plate is pulled out from between the bottom of the cargo space and the products. In the apparatus, there is a frame supporting a movable transfer plate. The apparatus also includes transfer means for moving the transfer plate and the products into the cargo space, and for pulling the transfer plate away from between the bottom of the cargo space and the products.

A drawback with such an apparatus is that significant force is applied to one end of the transfer plate as it is pushed into the cargo space. All of the force required to push the load into the container is applied to one end, which can result in buckling of the transfer plate with the load thereon. To accommodate the forces applied to the end of the transfer plate, this prior art transfer plate is thickened at one end in a wedge-like manner.

This prior art apparatus also requires a support or barrier that presses against the articles at one end of the transfer plate after the transfer place has entered the cargo space. In particular, the articles are pushed with supporting cylinders further inside the transport space, which can cause damage to the articles.

WO2019206710 addresses the issues mentioned above with respect to WO 9523105 by providing an apparatus for loading/unloading a shipping container, comprising a slip sheet having series of holes therein. The slip sheet is configured to slide, together with an article thereon, into and out of the shipping container. A transfer means, having extendable and retractable sets of pins, is positioned underneath the slip sheet. The pins extend to engage with the holes in the slip sheet and the pins retract after engagement with the holes. When the pins are extended (engaged with the slip sheet), the slip sheet can be pulled in and out of the shipping container. However, there can be issues with alignment of the pins with the holes as well as providing a smooth transition from one set of pins to another.

There is a need for an apparatus for loading/unloading a shipping container which addresses the drawbacks of the prior art.

SUMMARY

The present teachings relate to an apparatus for loading a shipping container, comprising a transfer plate having a first set of holes and a second set of holes therein and configured to slide, together with an article thereon, into and out of the shipping container, a transfer means positioned underneath the transfer plate having a first carriage with a first set of pins and a second carriage with a second set of pins, the first set of pins configured to extend into the first set of holes and the second set of pins configured to extend into the second set of holes to pull the transfer plate into and out of the shipping container, and a controller configured to extend the second set of pins into the second set of holes when the first sets of pins are already extended into the first set of holes.

The controller may be further configured to withdraw the first carriage while advancing the second carriage to disengage the first set of pins from the first set of holes and to engage the second set of pins with the second set of holes.

The controller may be further configured to withdraw the first carriage by a predetermined distance while advancing the second carriage by the same predetermined distance.

The controller may be further configured to retract the first set of pins once the first carriage has been withdrawn by the predetermined distance.

The controller may be further configured to pause movement of the first and second carriages for a predetermined time period once the first carriage has been withdrawn by the predetermined distance.

Optionally, the first set of holes and the second set of holes are offset from each other.

The apparatus may be configured such that the first carriage and second carriage are synchronised such that when one of the carriages advances the other carriage withdraws.

The transfer means may be configured such that the sets of pins extend to be flush with the surface of the transfer plate on which the article is placed.

The apparatus may further comprise an under plate on which the transfer plate can slide when pulled.

Optionally, each carriage comprises two hydraulic cylinders connected by a support bracket.

The hydraulic cylinders of the first carriage may be synchronised with the hydraulic cylinders of the second carriage such that if the cylinders of the first carriage are extended, the cylinders of the second carriage are proportionally retracted.

The present teachings also provide a method of operating an apparatus for loading a shipping container, comprising providing a transfer plate having a first set of holes and a second set of holes therein and configured to slide, together with an article thereon, into and out of the shipping container, providing a transfer means positioned underneath the transfer plate having a first carriage with a first set of pins and a second carriage with a second set of pins, the first set of pins configured to extend into the first set of holes and the second set of pins configured to extend into the second set of holes to pull the transfer plate into and out of the shipping container, and providing a controller instructing the second set of pins to extend into the second set of holes when the first sets of pins are already extended into the first set of holes.

The method may further comprise the controller instructing the first carriage to extend while instructing the second carriage to advance in order to disengage the first set of pins from the first set of holes and to engage the second set of pins with the second set of holes.

The method may further comprise the controller instructing the first carriage to withdraw by a predetermined distance while instructing the second carriage to advance by the same predetermined distance.

The method may further comprise the controller instructing the first set of pins to retract once the first carriage has been withdrawn by the predetermined distance.

The method may further comprise the controller instructing to pause movement of the first and second carriages for a predetermined time period once the first carriage has been withdrawn by the predetermined distance

BRIEF DESCRIPTION OF THE DRAWINGS

The invention will now be illustrated by the following description of embodiments thereof, given by way of example only, with reference to the accompanying drawings, in which.

DETAILED DESCRIPTION OF PREFERRED EMBODIMENTS

Figure 1:
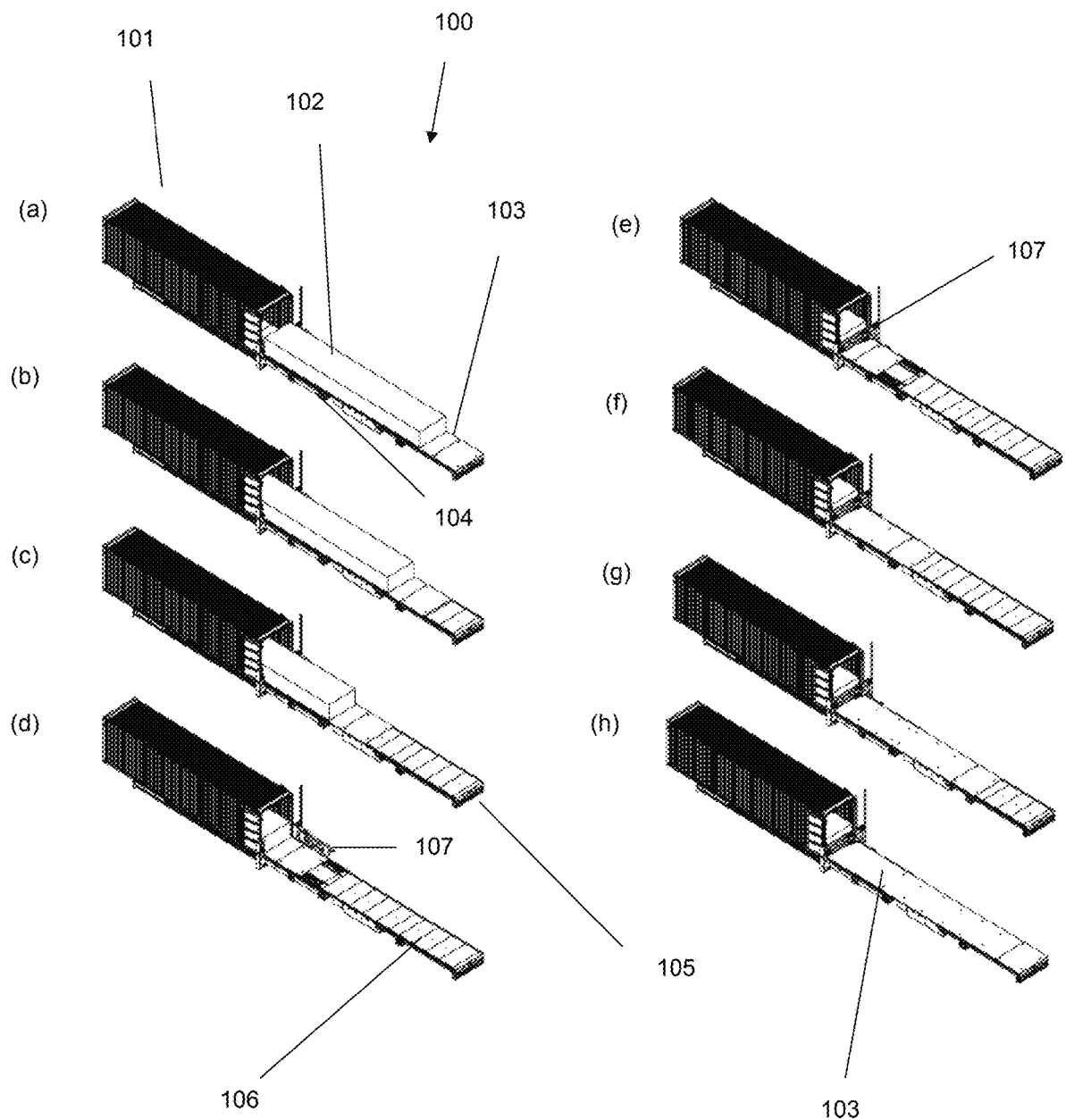
FIG. 1 provides perspective views of an apparatus for loading a shipping container, depicted at different stages of operation.

Referring to FIG. 1 an apparatus 100 for loading a shipping container 101 is shown in perspective view.

In particular, FIG. 1(a) shows the apparatus 100 with an article 102 for loading into the shipping container 101 thereon. Specifically, the article 102 is loaded onto a transfer plate 103, which is configured to slide into the container 101. A transfer means 104, positioned underneath the transfer plate 103 is configured to engage with the transfer plate and move it in and out of the shipping container 101. The internal working of the transfer means 104 will be described in more detail hereinafter.

Although a single article 102 is shown, any number of articles can be loaded onto the transfer plate 103. Furthermore, any suitable means known to those skilled in the art can be used to load an article(s) onto the transfer plate 103.

In FIG. 1(b), it can be seen that the transfer plate 103 is moved partially into the shipping container 101 with the article 102 thereon. That is, the transfer means 104 engages the transfer plate 103 to pull it into the shipping container 101. The transfer plate 103 continues to move into the shipping container in FIGS. 1(c) and 1(d).

It can be seen that the transfer plate 103 and transfer means 104 are comprised within a housing or frame 105. The shipping container 101 can also be positioned on this frame 105 or positioned against the frame 105 (while on a body of a lorry or another frame etc.). In the preferred embodiment, the apparatus is configured such that the transfer means 104 in positioned adjacent the opening of the container 101. In this manner the transfer means 104 pull the transfer plate into the shipping container as opposed to pushing it from a distance far removed from the container.

As the transfer plate 103 is pulled into the container 101, it can be seen that the transfer plate slides on an under plate 106. This under plate or wear plate can be comprised of any suitable material so long as it allows the transfer plate to freely and easily slide thereon. Nylon, steel, bronze etc. are suitable materials.

Turing to FIG. 1(e), the article 102 has been completely loaded into the shipping container. A barrier gate or rear barrier 107, which was previously in the open position (FIGS. 1(a)-(d)), is then swung across the transfer plate 103 to hold the article 102 in place as the transfer plate 103 is pulled from the shipping container 101. The barrier gate 107 includes an offset portion, which holds the article a predefined distance within the shipping container 101. As will be explained in more detail herein after, this keeps the article 102 away from the opening of the shipping container and allows the doors thereof to close once loading is complete.

It will be appreciated that a portion of the transfer plate 103 never enters the container 101 as a portion of the transfer plate must always be engaged by the transfer means 104, which is part of the apparatus 100 outside the shipping container 101.

FIGS. 1(e) to (h) shows the progression of the transfer plate 103 as is pulled by the transfer means 104 from the shipping container 101. The barrier gate 107 remains in place (closed) until the transfer plate is fully retracted or removed from the shipping container.

Once the transfer plate 103 is completely removed from the shipping container 101, the barrier gate 107 can be opened and the doors of the shipping container closed. The shipping container is then ready for shipping with the article securely loaded therein.

Figure 2:
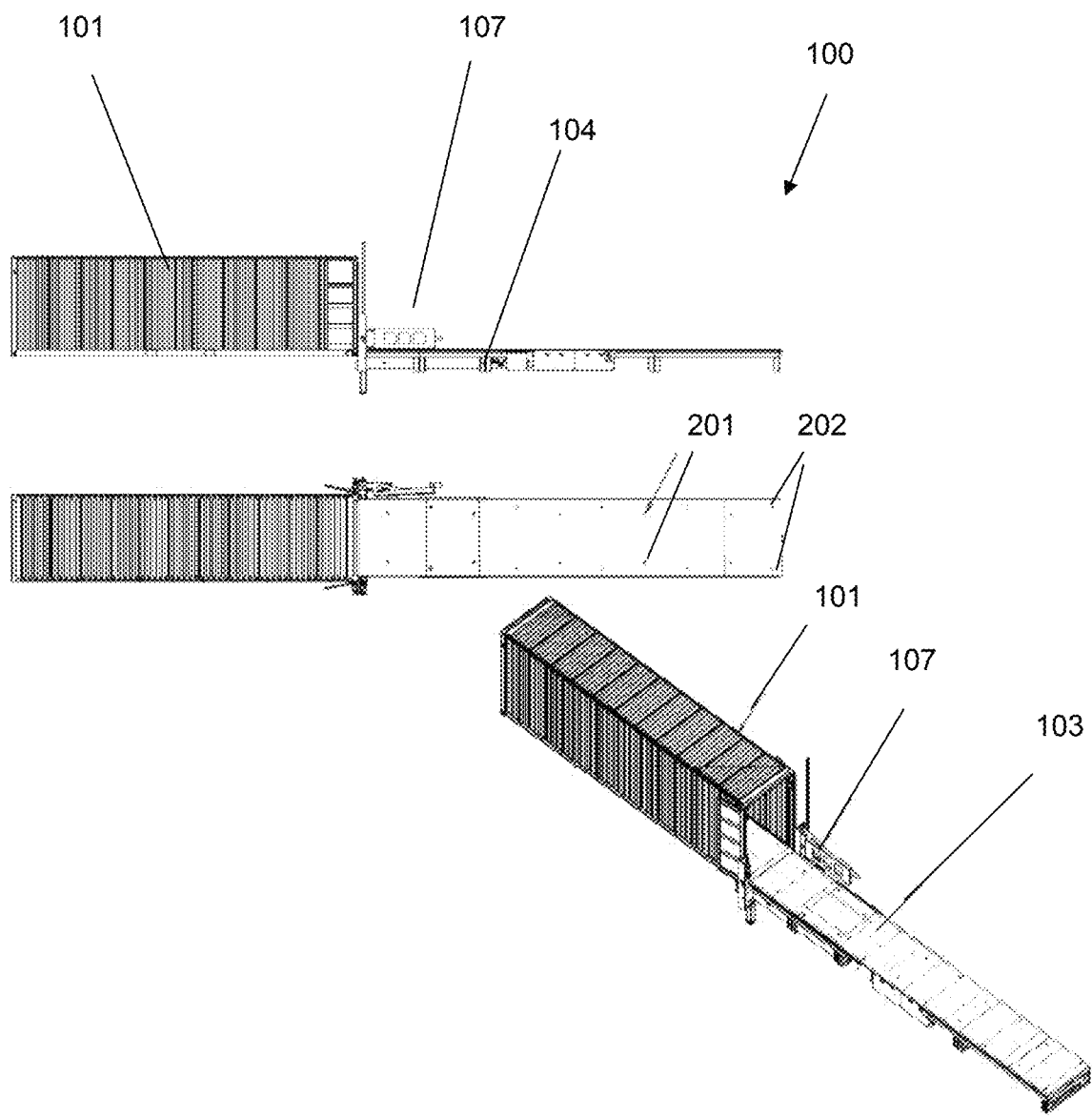
FIG. 2 provides further views of the apparatus for loading a shipping container in operation without any article thereon.

FIG. 2 shows the apparatus 100 for loading a shipping container 101 without any article thereon. The transfer plate 103 is fully outside the shipping container 101. It can be seen that the transfer plate 103 has an inner set of holes 201 and an outer set of holes 202 that run along the length of transfer plate 103. As will be explained in more detail hereinafter, each set of holes is engaged by a different carriage of the transfer means 104 to pull the transfer plate in and out of the shipping container. The inner set of holes 201 is offset from the outer set of holes 202 i.e., these holes are slightly closer to a centre line of the transfer plate. Having two sets of holes configured as shown is not essential and one or both sets of holes could be placed more centrally than shown in the figures.

Figure 3:
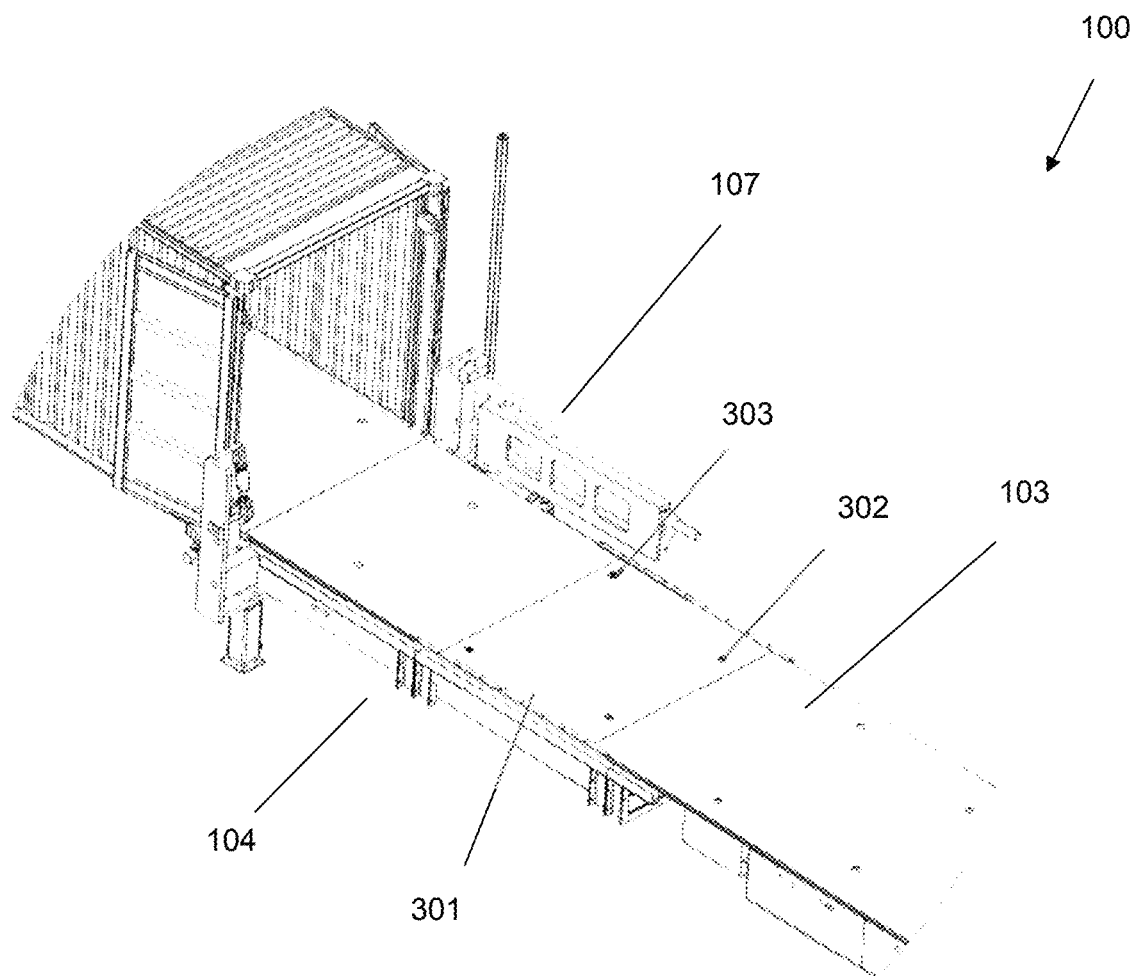
FIG. 3 is a more detailed view of a portion of the apparatus for loading a shipping container.

Turning to FIG. 3, this shows a more detailed view of a portion of the apparatus 100 for loading a shipping container. Specifically, the transfer means 104 is shown underneath the transfer plate 103. Although the internal components of the transfer means 104 cannot be seen, the transfer means comprises hydraulic rams, which extend and retract in order for the transfer means to engage with holes 201, 202 in transfer plate 103. Once a carriage of the transfer means 104 is engaged with the transfer plate 103, it can pull it into the container 101 or out of the container 101. The transfer means 104 also comprises retractable and extendable pins 302, 303. As will be explained in more detail hereinafter, once a carriage of the transfer means 104 is positioned correctly, pins extend into the holes 201, 202 such that the transfer means can hold or grip the transfer plate 103. The pins 302, 303 extend only as far as the top surface of the transfer plate. To extend any further would risk damaging any article(s) 101 positioned on the transfer plate 103 for loading.

Figure 4:
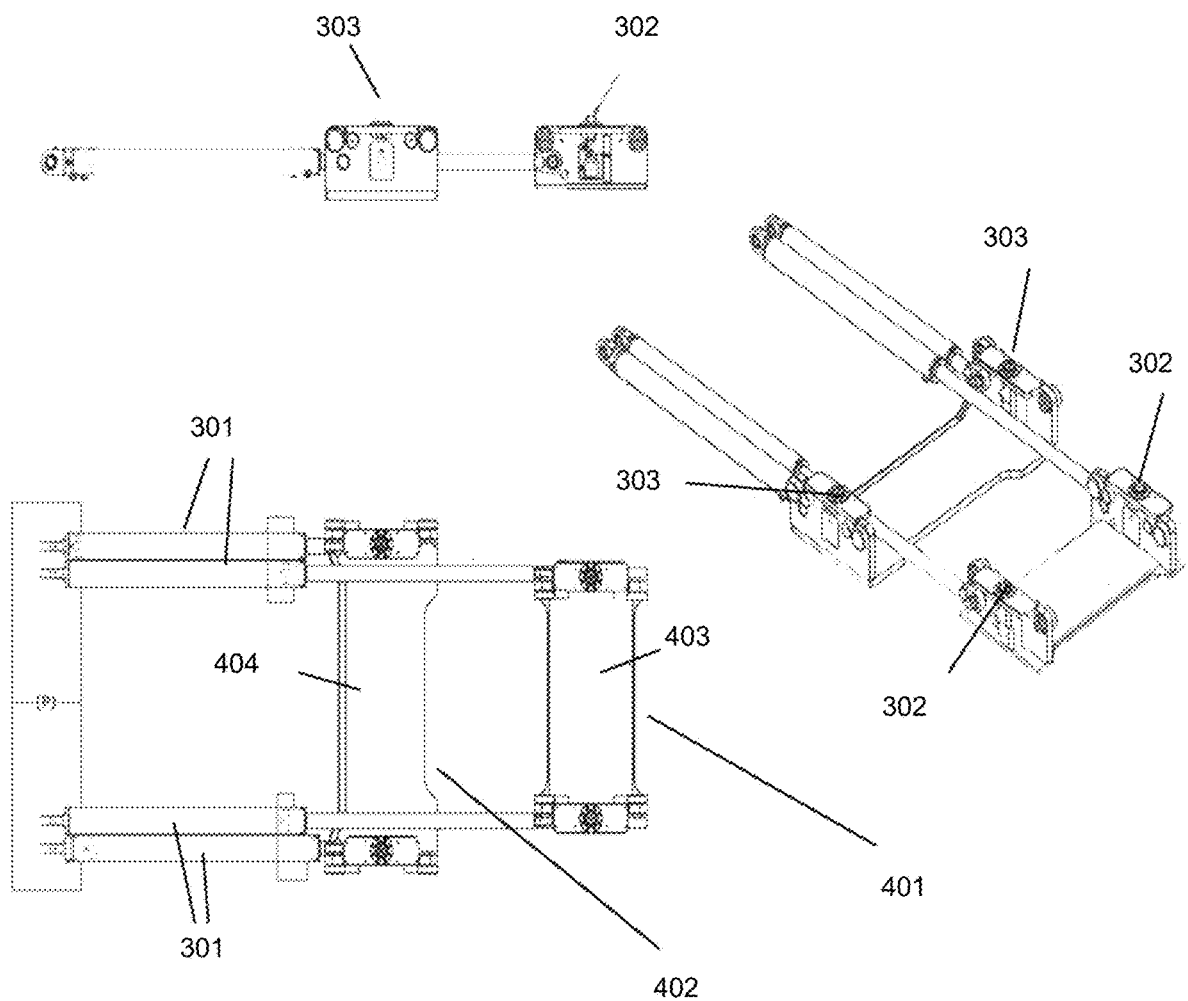
FIG. 4 provides a number of views of the internal components of the apparatus for loading a shipping container.

With reference to FIG. 4, this provides a number of views of the internal components of the apparatus 100. Specifically, the internal components of the transfer means 104 are shown. In the exemplary embodiment, the transfer means 104 comprises two carriages, an inner carriage 401, and an outer carriage 402. Each carriage 401, 402 comprises two hydraulic cylinder 301, a support bracket 403, 404 and two hydraulic pins 302, 303.

FIGS. 5(a) to 5(d) will be described hereinafter, which show the operation of the apparatus in accordance with a controller (not shown) of the apparatus. In these figures, the transfer plate is not shown so that the components of the transfer means can be seen.

Figure 5A:
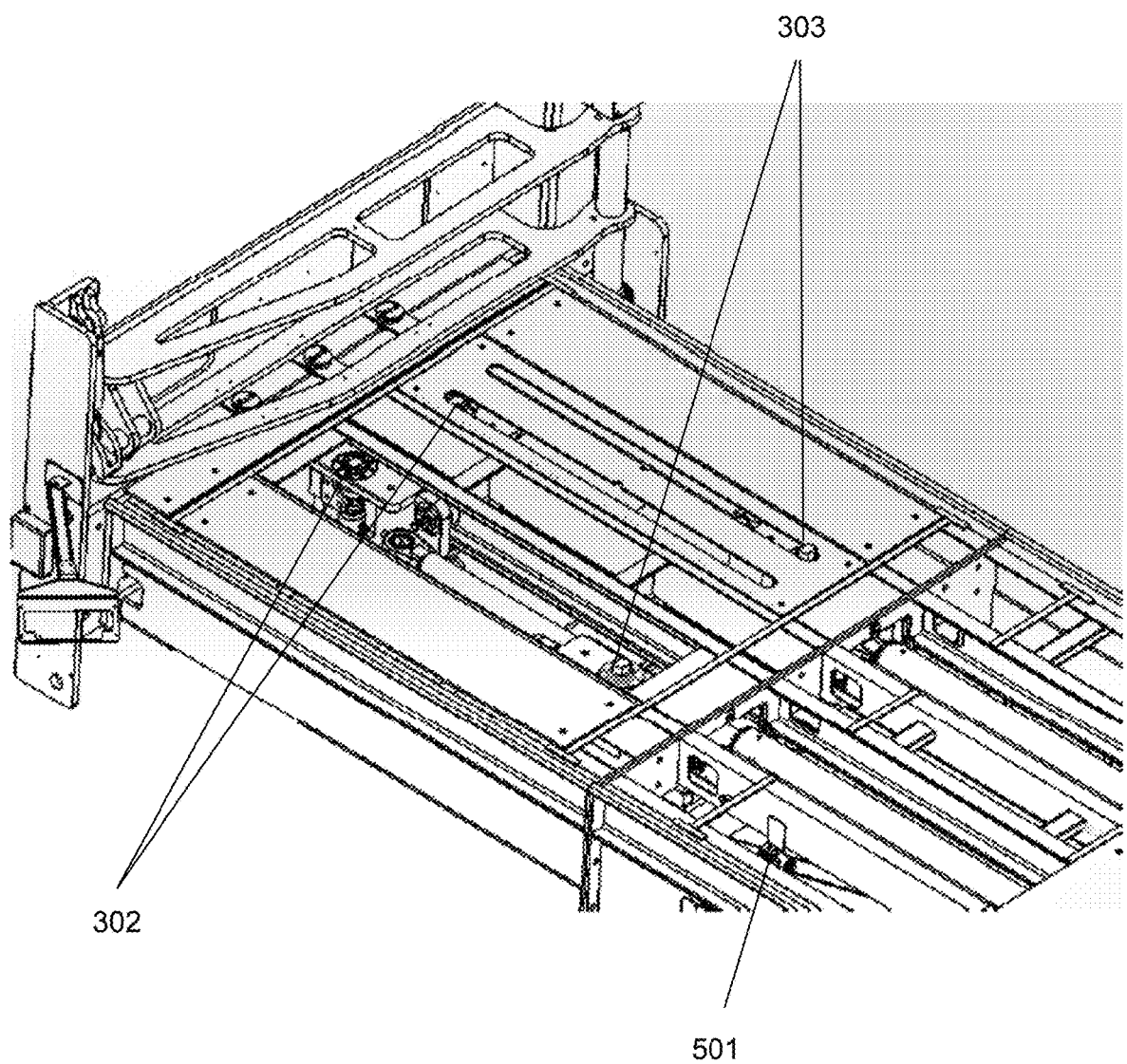
FIGS. 5(a) to 5(d) provide show the operation of the apparatus for loading a shipping container.
Figure 5:
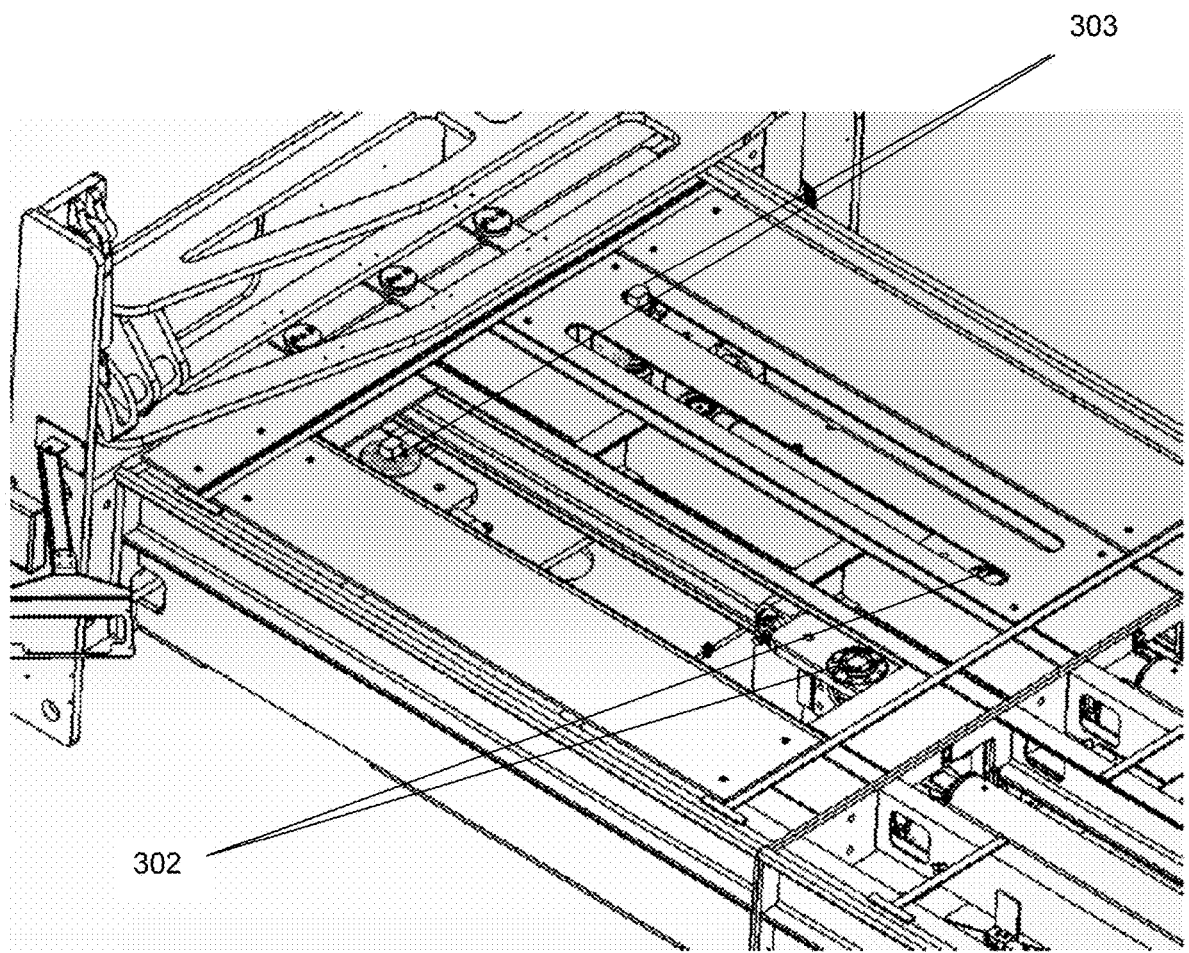

In FIG. 5(a), the outer set of pins 303 are extended (or up) and engaging transfer plate to push or pull the plate into or out of a container. The inner set of pins 302 are withdrawn (or down). In this figure, a 6 port divider 501 is also shown. As will be explained in more detail later, it ensures independent movement of the sets of pins 302, 303.

In FIG. 5(b), it can be seen that outer carriage 402, with outer set of pins 303 extended, has moved forward bringing the transfer plate forward with it. Since the two carriages are synchronised the inner carriage 401 has moved in the opposite direction (backwards) with the inner sets down. Essentially the inner carriage is sliding under the transfer plate which is being moved in the opposite direction. The inner carriage 401 is moved until the desired distance between the two carriages is reached and the inner carriage 401 (as well as the outer carriage 402) is stopped. This ensures that the inner set of pins 302 are aligned with the inner set of holes 201 in the transfer plate. That is, the pins are centred with the holes for changing over (engagement with the transfer plate) from the outer carriage to the inner carriage.

Figure 5C:
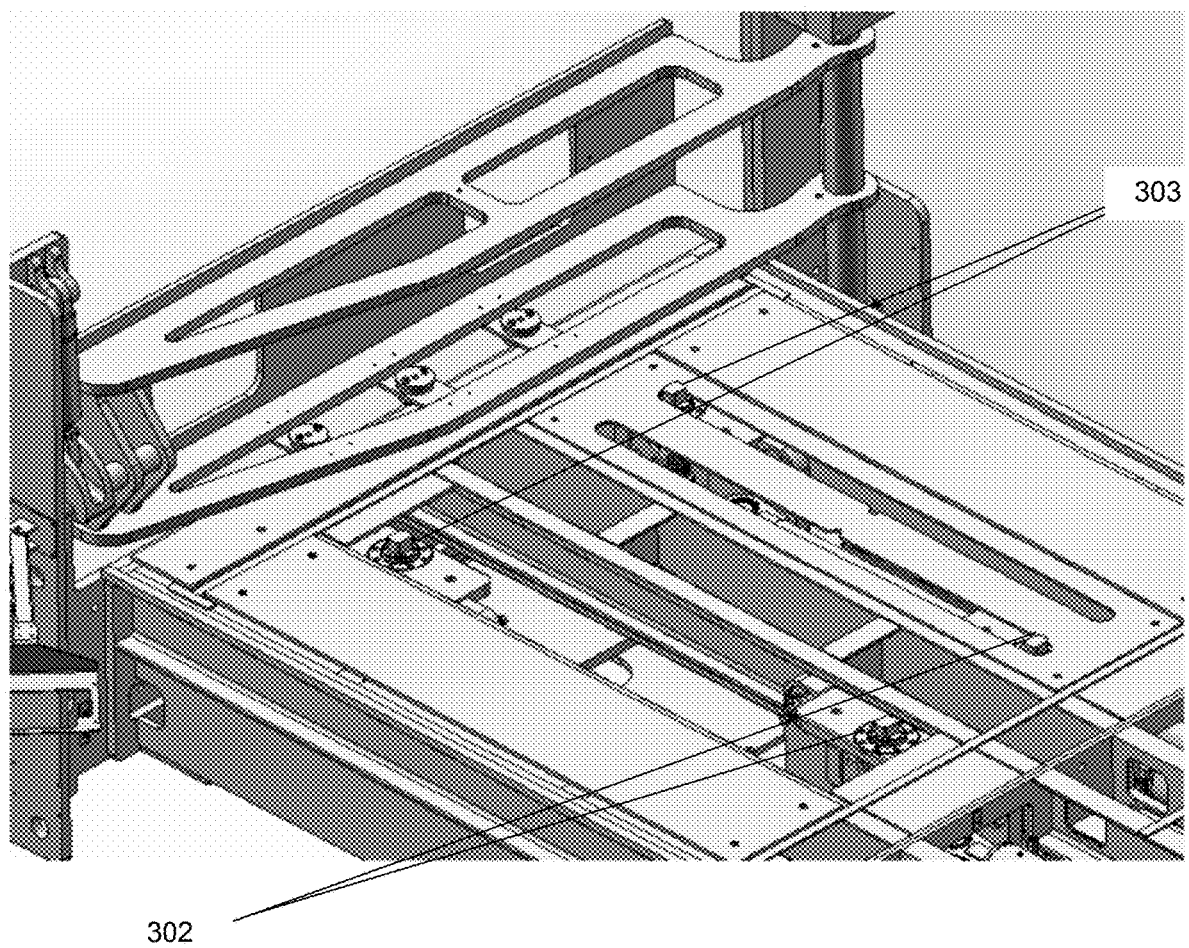

As shown in FIG. 5(c), the controller of the apparatus will then instruct the inner set of pins 302 to extend into the inner set of holes once centred. The inner carriage 401 will then move forward (toward the outer carriage 402) a predetermined distance to engage with the inner set of holes i.e., contact the edge of holes and/or apply pressure to the edge of the inner set of holes of the transfer plate. Since the movements of the inner carriage 401 and outer carriage 402 are synchronised the outer carriage 402 will move backward (towards the inner carriage 401), by the predetermined distance, at the same time as the inner carriage is moving forward. This means that the outer set of pins 303 will disengage with the outer set of holes and no longer contact the edges of the holes.

Figure 5D:
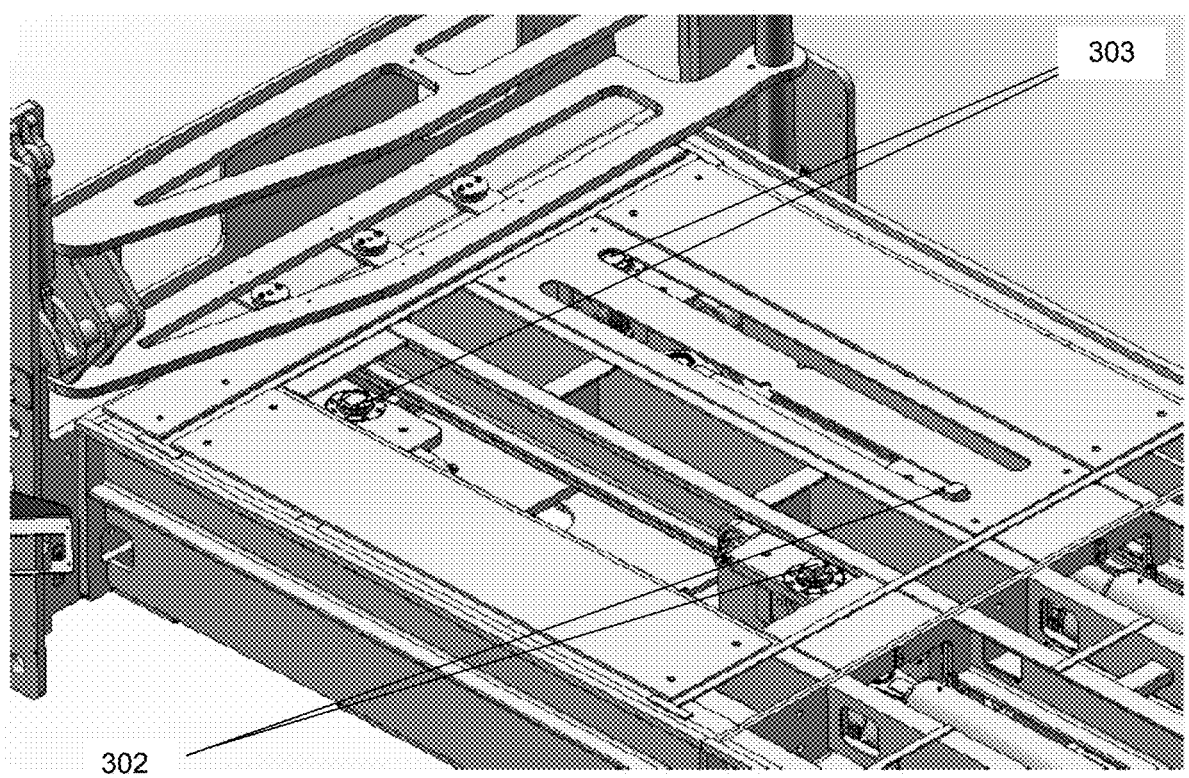

As shown in FIG. 5(d), once the outer of pins 303 are no longer engaging the inner set of holes of transfer plate, they can be retracted. The inner carriage 401 can then move forward (towards the outer carriage 402) to move the transfer plate. That is, once the inner carriage 401 takes the pressure of the transfer plate and the outer carriage 402 has backed off into the centre of the hole the pins will retract. The inner carriage 401 will then continue and the cycle will repeat again.

As previously mentioned, the first and second carriages 401, 402 are synchronised. That is, when one carriage is extended, the other carriage is retracted at the same time. The hydraulic rams of each carriage are synchronised e.g., if the rams 301 of one carriage are 75% extended, the rams 301 of the other carriage are 25% extended.

The reverse operation as that described in the previous paragraph is used to pull the transfer plate out of the shipping container. That is, instead of rams retracting to pull the transfer plate into the container, the rams extend to pull the transfer plate out of the shipping container.

Conceivably, the reverse operation as that described above could also be used to pull articles into the shipping container. That is, instead of rams retracted to pull items into the container, the rams could extend to pull the transfer plate into the shipping container.

The second carriage engages with an outer set of holes 202 (located closer to the outside of the transfer plate). At any given time, one of the carriages 401, 402 is engaging the transfer plate i.e., the pins 302, 303 of one of the carriages 401, 402 are extended and the transfer plate is being moved by one of the carriages. There is a brief pause in movement as engagement with one set of pins is switched to engagement with another one set of pins. As previously outlined, this brief pause is used to centre the pins within the holes and ensure a smooth transition such that one set of pins slowly engages a corresponding set of holes while the other set of pins disengages from a corresponding set of holes. This configuration ensures that there is no spring back when a set of pins is retracted or withdrawn since the other set of pins has already engaged the transfer plate and is applying pressure to it. It has been found in the prior art that this spring back of the transfer plate can lead to misalignment with the pins i.e., when one set of pins is withdrawn the other set of pins may no longer be aligned with the corresponding set of holes if spring back occurs. This is avoided by having one set of pins extend before retracting the already extended other pins. It will also be appreciated that by avoiding repeated contact between the pins and the holes in the transfer plate during retraction this will avoid wear on the holes, perhaps distorting their shape etc. As previously outlined, before retracting the pins, the controller is configured to move the pins a predetermined distance away from the edge of the holes. This distance may be 12.5 mm but is adjustable based on the chosen size of the holes, pins etc. In the exemplary embodiment, once both pins are up, the outside carriage will back off by 12.5 mm while the inside carriage is moving forwards to come in contact with the transfer plate. This means that the sheet will not move (spring back force) while switching over.

Figure 6:
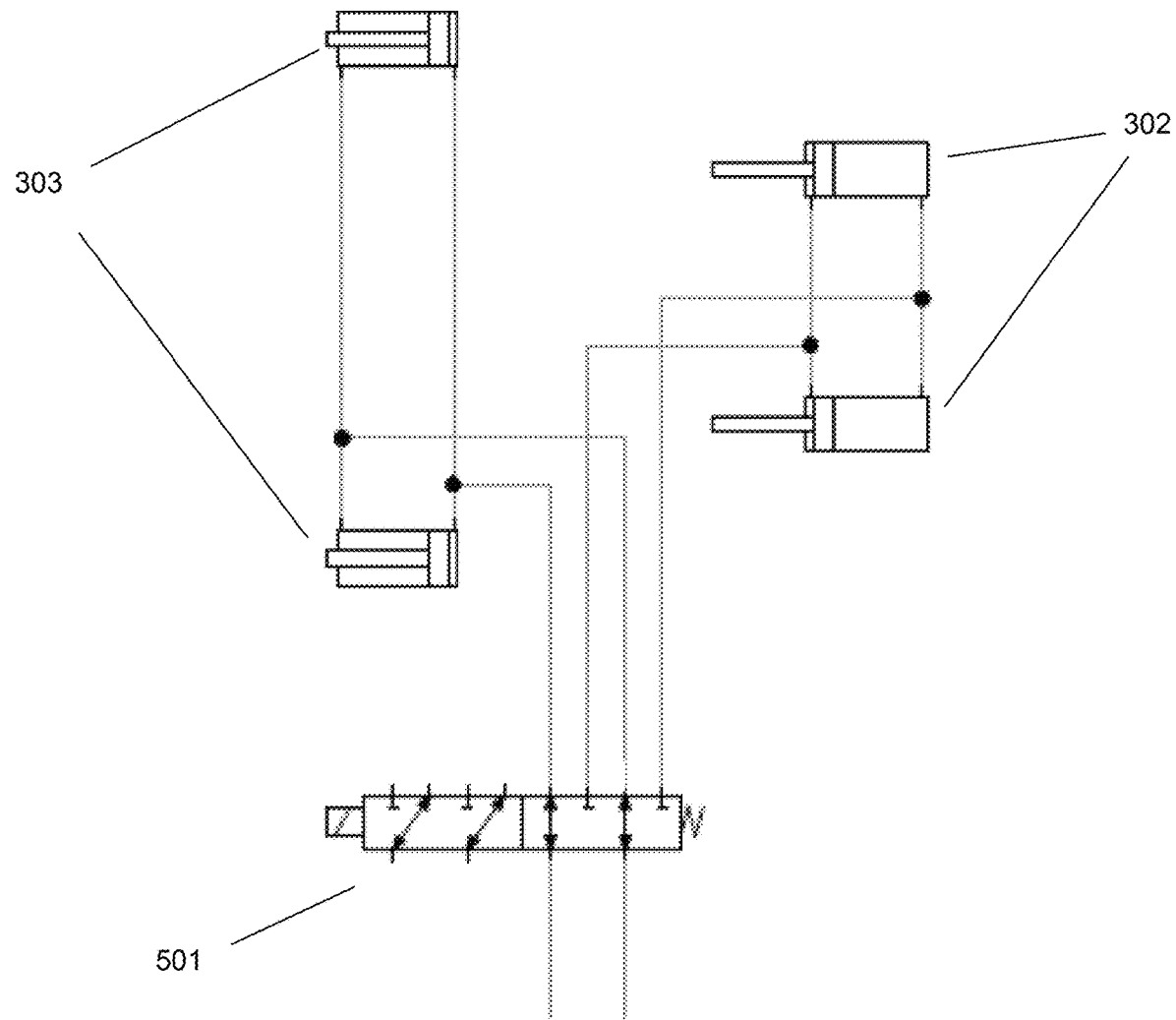
FIG. 6 is an oil flow circuit diagram for components of the apparatus for loading a shipping container.

Turning to FIG. 6, this shows the previously mentioned six port divider 501, which is included in the hydraulic oil line that feeds the cylinders for the sets of pins 302, 303. This allows for both sets of pins to be up at the same time which ensures the pins cannot fall out of alignment with the holes in the transfer plate while the switch over between the outer carriage and the inner carriage is occurring. The person skilled in the art will appreciate that other means for ensuring the pins can extend and retract independently can be used.

Figure 7:
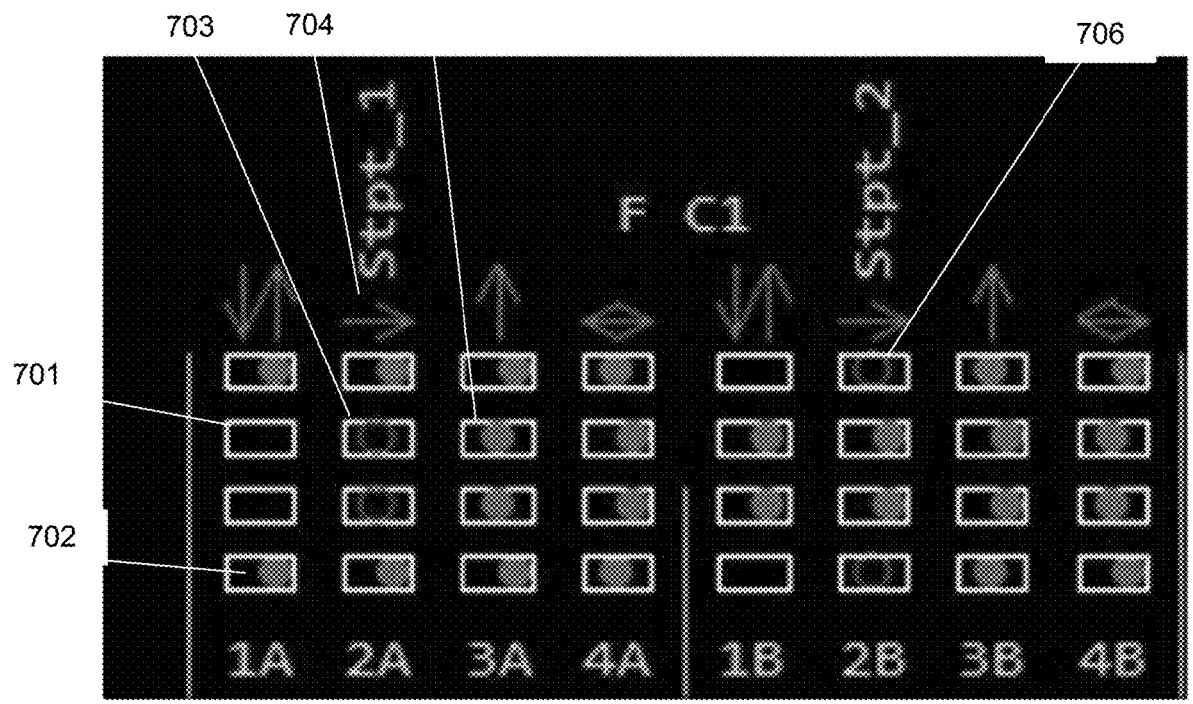
FIG. 7 is a state machine diagram for a controller of the apparatus for loading a shipping container.

With regard to FIG. 7, this shows a portion of the code state machine for the previously mentioned controller, which controls the movement of the carriages and sets of pins. The holes in the transfer plate are labelled as 701. Each step (stpt_1, stpt_2) has four states. In state 1A, outer carriage pins 702 are up. In state 2A, inner carriage pins 703 are down and outer carriage moves forward 704. In state 3A and 4A, inner carriage pins are up 705. In the second step (stpt_2) it can been seen that outer carriage pins are down 706. It will be appreciated that the state machine continues on past the steps shown in accordance with the previously outlined operation of the controller. It will also be appreciated that the controller can be programmed as appropriate by the person skilled in the art.

The invention is not limited to the embodiments described herein which may be varied within the scope of the claims that follow.

The invention claimed is:

1. An apparatus for loading a shipping container, comprising:
    a transfer plate having a first set of holes and a second set of holes therein and configured to slide, together with an article thereon, into and out of the shipping container;
    a transfer means positioned underneath the transfer plate having a first carriage with a first set of pins and a second carriage with a second set of pins, the first set of pins configured to extend into the first set of holes and the second set of pins configured to extend into the second set of holes to pull the transfer plate into and out of the shipping container; and
    a controller configured to extend the second set of pins into the second set of holes when the first sets of pins are already extended into the first set of holes.

2. The apparatus according to claim 1 wherein the controller is further configured to withdraw the first carriage while advancing the second carriage to disengage the first set of pins from the first set of holes and to engage the second set of pins with the second set of holes.

3. The apparatus according to claim 2 wherein the controller is further configured to withdraw the first carriage by a predetermined distance while advancing the second carriage by the same predetermined distance.

4. The apparatus according to claim 3 wherein the controller is further configured to retract the first set of pins once the first carriage has been withdrawn by the predetermined distance.

5. The apparatus according to claim 3 wherein the controller is further configured to pause movement of the first and second carriages for a predetermined time period once the first carriage has been withdrawn by the predetermined distance.

6. The apparatus according to claim 1 wherein the first set of holes and the second set of holes are offset from each other.

7. The apparatus according to claim 1, wherein first carriage and second carriage are synchronized such that when one of the carriages advances the other carriage withdraws.

8. The apparatus according to claim 1 wherein the transfer means is configured such that the sets of pins extend to be flush with the surface of the transfer plate on which the article is placed.

9. The apparatus according to claim 1 further comprising an under plate on which the transfer plate can slide when pulled.

10. The apparatus according to claim 1 wherein each carriage comprises two hydraulic cylinders connected by a support bracket.

11. The apparatus according to claim 10 wherein the hydraulic cylinders of the first carriage are synchronized with the hydraulic cylinders of the second carriage such that if the cylinders of the first carriage are extended, the cylinders of the second carriage are proportionally retracted.

12. A method of operating an apparatus for loading a shipping container, comprising:
    providing a transfer plate having a first set of holes and a second set of holes therein and configured to slide, together with an article thereon, into and out of the shipping container;
    providing a transfer means positioned underneath the transfer plate having a first carriage with a first set of pins and a second carriage with a second set of pins, the first set of pins configured to extend into the first set of holes and the second set of pins configured to extend into the second set of holes to pull the transfer plate into and out of the shipping container; and
    providing a controller instructing the second set of pins to extend into the second set of holes when the first sets of pins are already extended into the first set of holes.

13. The method according to claim 12 further comprising the controller instructing the first carriage to extend while instructing the second carriage to advance in order to disengage the first set of pins from the first set of holes and to engage the second set of pins with the second set of holes.

14. The method according to claim 13 further comprising the controller instructing the first carriage to withdraw by a predetermined distance while instructing the second carriage to advance by the same predetermined distance.

15. The method according to claim 14 further comprising the controller instructing the first set of pins to retract once the first carriage has been withdrawn by the predetermined distance.

16. The method according to claim 14 further comprising the controller instructing to pause movement of the first and second carriages for a predetermined time period once the first carriage has been withdrawn by the predetermined distance.

* * * * *